March 22, 1960 R. E. SPRENKLE 2,929,248
FLOW METER
Filed Nov. 13, 1957 6 Sheets-Sheet 1

INVENTOR.
RAYMOND E. SPRENKLE
BY
ATTORNEY

March 22, 1960 R. E. SPRENKLE 2,929,248
FLOW METER
Filed Nov. 13, 1957 6 Sheets-Sheet 2

INVENTOR.
RAYMOND E. SPRENKLE
BY
ATTORNEY

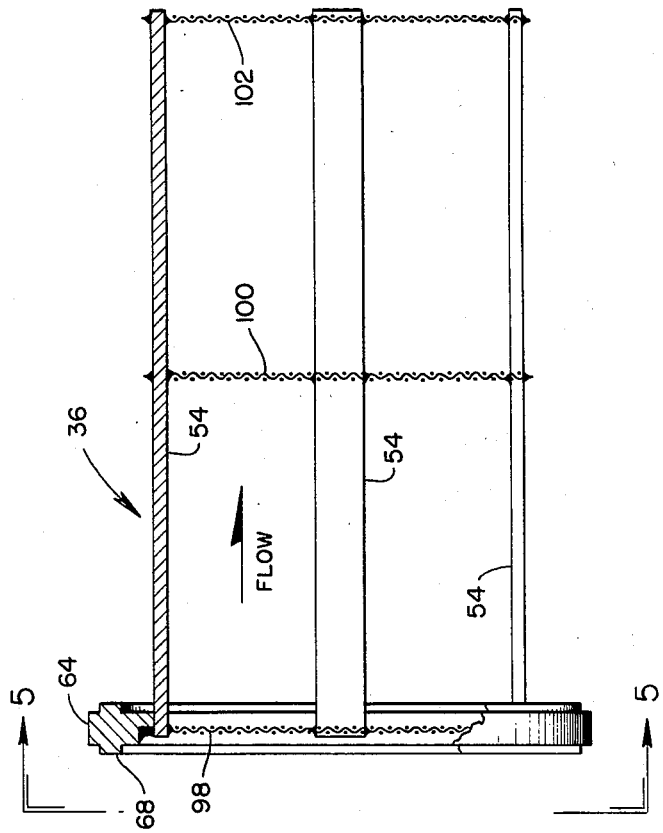
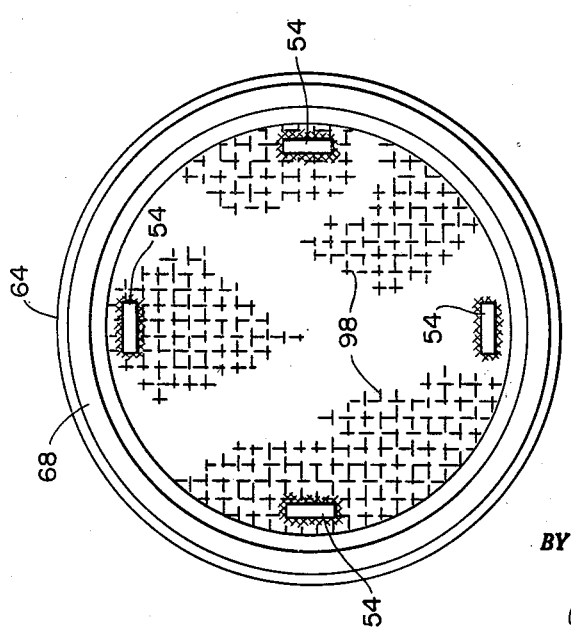

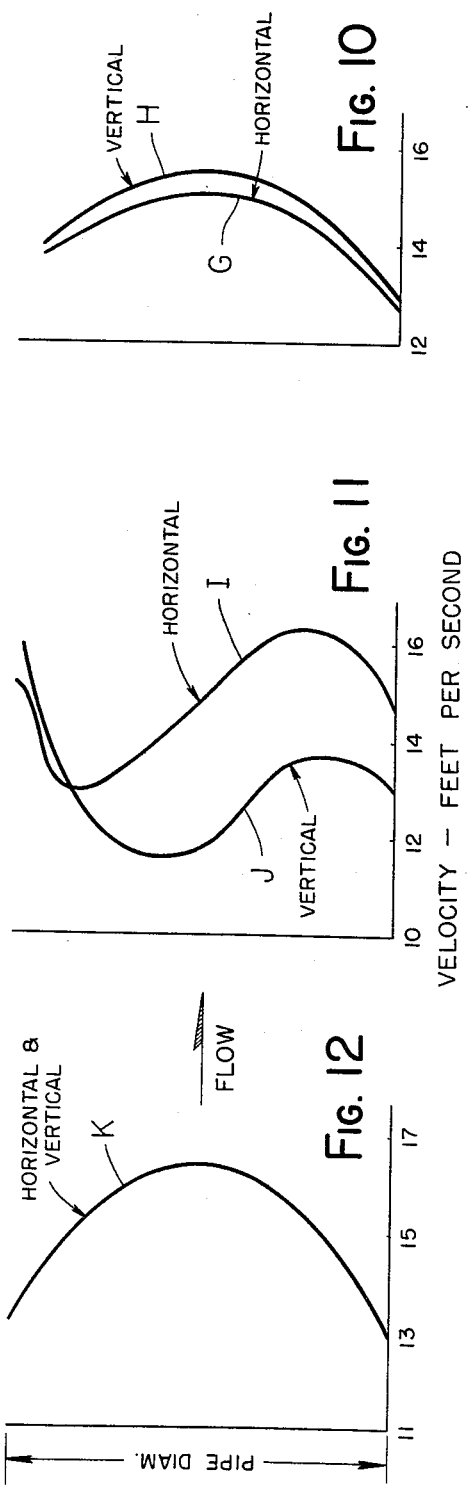

United States Patent Office 2,929,248
Patented Mar. 22, 1960

2,929,248

FLOW METER

Raymond E. Sprenkle, East Cleveland, Ohio, assignor to Bailey Meter Company, a corporation of Delaware Application November 13, 1957, Serial No. 696,170

12 Claims. (Cl. 73—198)

This invention relates to apparatus for measuring the flow of fluid in a closed conduit or pipe and more particularly to apparatus for conditioning the flowing fluid for measurement.

The flow of a fluid through a closed conduit or pipe is usually turbulent. Under this condition mixing of the fluid takes place while the fluid proceeds down the pipe or conduit which serves to produce and maintain a velocity profile approximately parabolic in shape which is symmetrical about the longitudinal axis of the conduit such as shown for example in Fig. 12. So long as the flow is uniformly turbulent this profile is maintained and exhibits no discontinuity regardless of the axial velocity of the fluid.

Use has long been made of this phenomena in the art of flow measurement. It is well known, for example, that a primary element such as an orifice, flow nozzle or Venturi tube located in a pipe will produce a differential pressure varying in known and predictable relationship to the rate of fluid flow therethrough. Anything however in the pipe which causes a flow disturbance such as a bend, turn, valve, variation in pipe roughness, out of roundness, will produce a distortion in the normal velocity profile thus destroying the known and predictable relationship between differential pressure and rate of fluid flow. Such disturbances will, it has been found, under certain conditions even produce a discontinuity in the profile as the axial velocity is varied so that in place of the differential pressure produced by a primary element increasing with increasing fluid flow it may even decrease over certain parts of the range in velocities.

For turbulent flow after a disturbance to establish a normal velocity profile suitable for flow metering requires that the primary element be preceded by a considerable length of straight pipe. The length of straight pipe required depends not only on the beta ratio of the primary element but also on the piping configuration ahead of the straight run. Reference is made, for example, to the authoritative publication; Fluid Meters, Their Theory and Application, part 1, 5th edition, published by The American Society of Mechanical Engineers. Fig. 16D of this publication indicates that for a primary element having a beta ratio of 0.7, thirty diameters of straight pipe are required, if it in turn is preceded by two elbows at right angles to each other; whereas twelve diameters are required even if the straight run is preceded by a simple L. These are furthermore the minimum runs of straight pipe required and practice has indicated that for maximum accuracy considerable more should be used.

The problems involved in providing the required straight pipe have been in many cases practically insurmountable. Present power plant practice for example frequently requires high pressure, high temperature steam lines of 12 inch diameter or more which means that the primary element under some conditions should be preceded by upward of 40 feet of straight pipe which is usually physically impractical to do and exceedingly expensive if it can be done.

Furthermore while a long straight run of pipe will tend to remove distortions in the velocity profile caused by the piping configuration it of itself may introduce distortions caused, for example, by variations in pipe wall smoothness or roughness, foreign material adhering to the wall of the pipe, mismatching of mating flanges or welded ends, out of roundness, etc. For these reasons even with ideal piping conditions it has not been possible to predict or reproduce the relationship between rate of flow and differential pressure to the order of accuracy demanded by present day practice. Thus even while following precisely the practices recommended by authoritative bodies such as The American Society of Mechanical Engineers, a tolerance in the order of plus or minus two percent is the best that can be expected and this is the customary guarantee used in commercial practice.

To reduce the straight pipe required and the tolerance which must be allowed, it has become customary to locate a so-called strengthening vane or flow straightener from six to eight diameters upstream of the primary element. The usual type of straightening vane takes the form of a bundle of tubes or a plurality of parallel, horizontal and vertical plates about two diameters long which divide the flow into a great number of small isolated streams. These current forms of straightening vanes are not entirely satisfactory and as a matter of fact their use under certain conditions may prove treacherous. They are extremely expensive to construct. They do not materially decrease the overall length of straight pipe required. If used immediately following a turn or L they may serve to perpetuate the lopsided flow profile produced by centrifugal action rather than serving to exterminate it.

It is a primary object of my invention to provide a flow meter which is independent of its environment and will give equally accurate results regardless of the piping configuration preceding it or the condition of the pipe in which it is installed.

It is another object of my invention to provide a flow meter which requires a minimum run of straight pipe.

It is another object of my invention to provide a device which establishes a uniform turbulent flow of fluid in a conduit or pipe after a disturbance.

Still another object of my invention is to provide an extremely accurate flow meter.

Another object of my invention is to substantially eliminate the effect of disturbances in the fluid stream on the accuracy of a primary measuring element.

Other objects and advantages of my invention will become apparent from the following description taken in connection with the accompanying drawings in which:

Fig. 4 is a longitudinal view in partial section of a flow straightener embodying my invention illustrating a modified construction.

Fig. 5 is an end view taken along the line 5—5 of Fig. 4.

Figs. 9–14 are graphical illustrations of the results achieved through the use of my invention as compared to prior art devices.

In one preferred embodiment of my invention a plurality of flow straightening members are located in the pipe or conduit upstream of the primary measuring element. The straightening members are provided with a predetermined spacing between adjacent members so as to effect successive breakdown of the fluid flow into small turbulent sections to establish a uniform turbulent flow downstream of the last member.

Each of the flow straightening members comprises a thin plate or disc having a plurality of openings therein defining a flow area of predetermined relationship with the area of the conduit. I have found that this arrangement produces a remarkably flat uniform flow profile symmetrical about the longitudinal axis of the pipe or conduit such as shown for example in Fig. 10.

Figure 1:
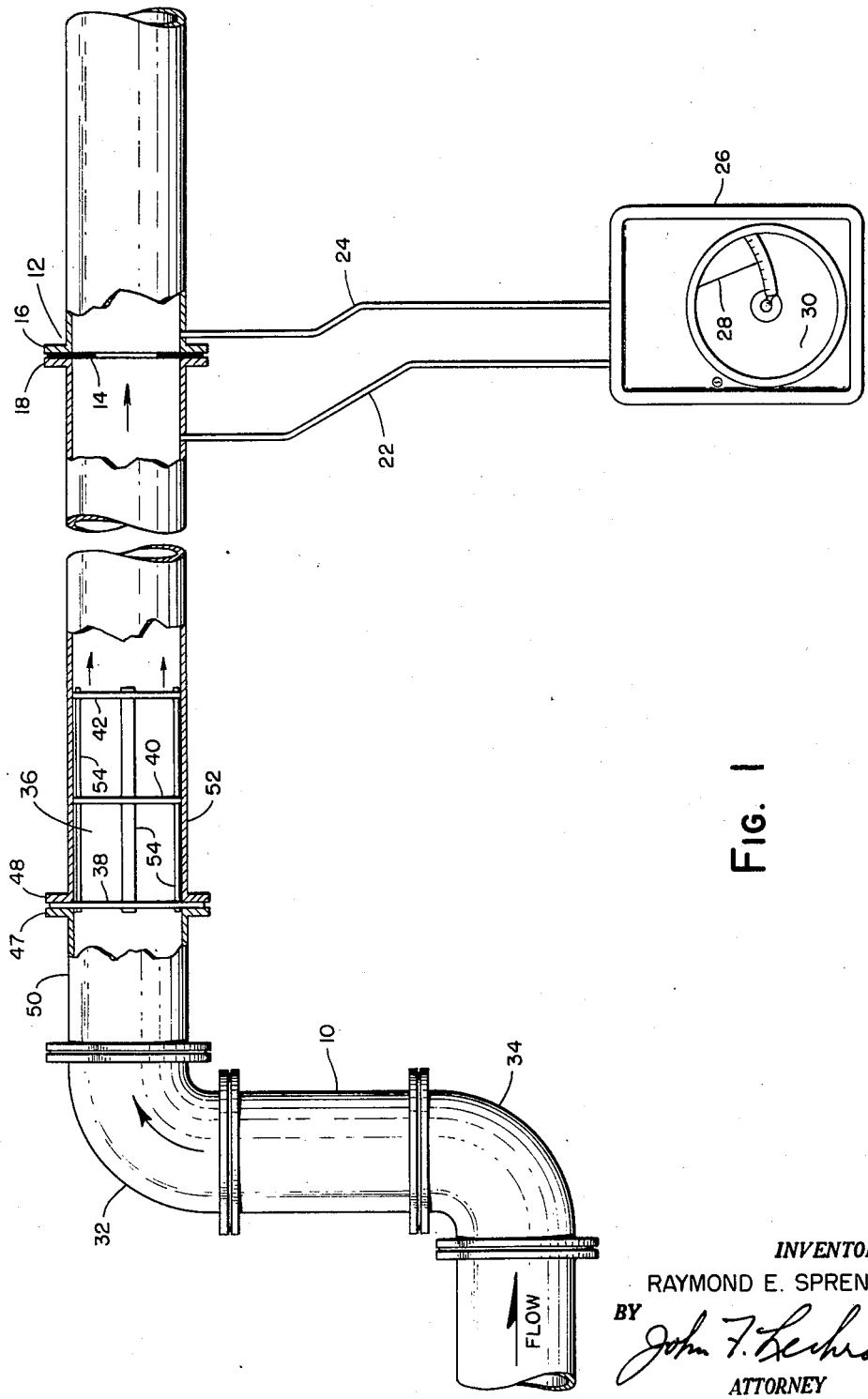
Fig. 1 is a somewhat schematic illustration of a fluid meter embodying my invention.

Reference is now made to Fig. 1 of the drawings illustrating this preferred form of my invention. There is shown therein a portion of a conduit or pipe 10 adapted for fluid flow therethrough. A conventional primary element indicated generally by the reference 12 is located in the pipe 10 and comprises a circular orifice plate 14 clamped between a pair of flanges 16, 18 of adjoining sections of the pipe 10. As well known in the art the orifice 14 serves to establish a pressure differential varying in relation to the rate of fluid flow.

The pipe 10 is provided with suitable openings on opposite sides of the plates 14 from which a pair of small tubes 22, 24 extend to an indicating, recording and/or integrating device indicated generally by the reference 26. The device 26 may be of any suitable differential pressure responsive type and is here shown as having a pen arm 28 movable over a circular time rotated chart 30 for recording and indicating the magnitude of fluid flow within the conduit 10.

As hereinbefore discussed, it is essential that the fluid flow at the primary element 12 be uniformly turbulent. As illustrated in Fig. 1, the pipe 10 includes a pair of elbows 32, 34 which are representative of pipe fittings found in the usual pipe installation. The elbows 32, 34 will produce whirls, swirls and spirals in the fluid flowing through the conduit 10 and accordingly distort the velocity profile of the fluid. To eliminate the effect of these disturbances and to obtain a uniform turbulent flow, a flow straightening device indicated generally by the reference 36 is positioned within the conduit 10 between the elbow 32 and the primary element 12.

The particular construction of the flow straightening device 36 eliminates the need for a long length of straight pipe preceding the primary element which is normally required to establish a uniform velocity profile. In addition, with the particular construction utilized, the flow straightening device 36 may be located closer to the primary element 12 than prior straightening devices hereinbefore discussed while at the same time providing more uniform turbulent flow of fluid.

Figure 2:
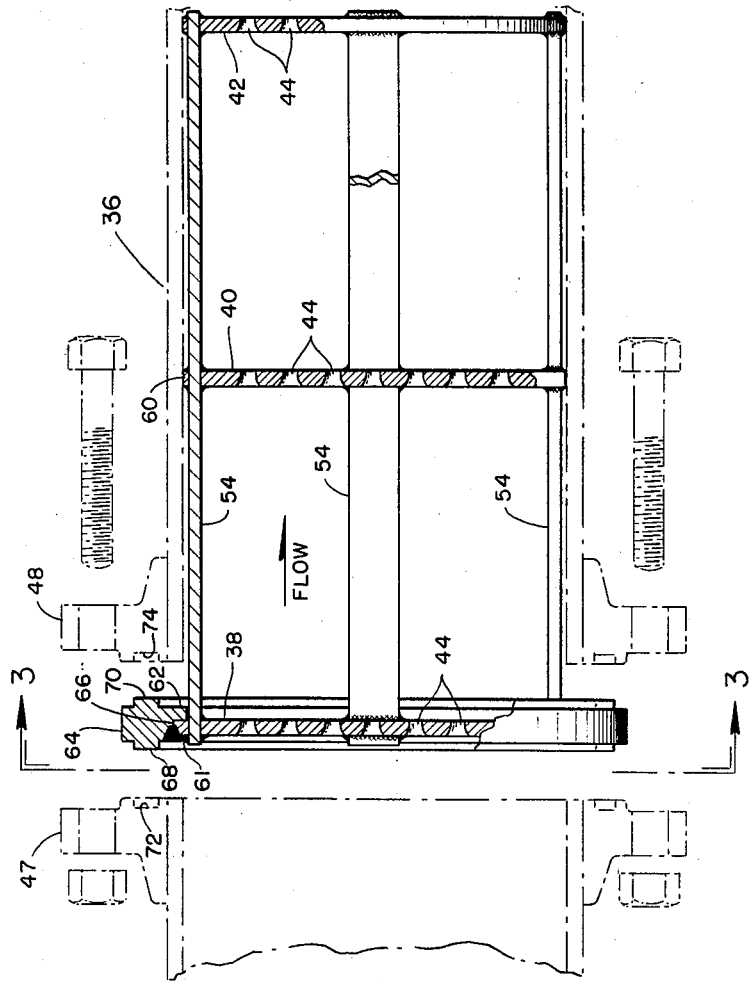
Fig. 2 is a longitudinal view in partial section of the flow straightener illustrated in Fig. 1.
Figures 6, 7:
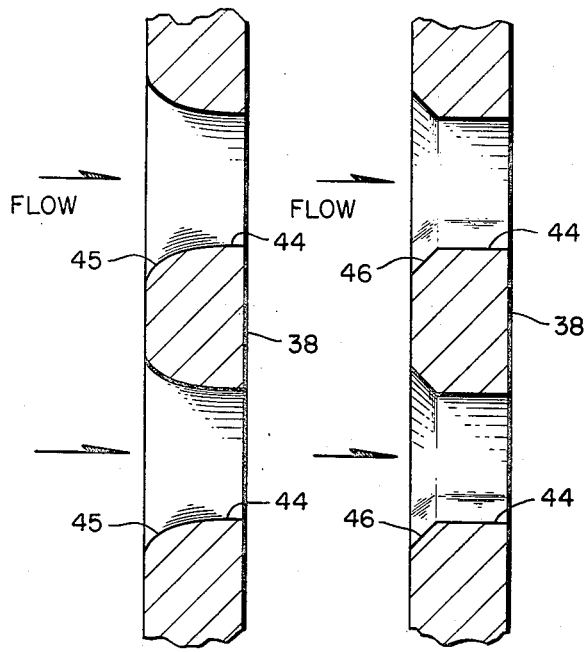
Fig. 6 is an enlarged sectional view of a portion of the flow straightener illustrated in Fig. 2.
Fig. 7 is a sectional view similar to Fig. 6 but illustrating a modified construction.

Referring now to Fig. 2 of the drawings, one preferred embodiment of the flow straightening device 36 includes a plurality (in this case 3) of spaced parallel circular plates or discs 38, 40, 42. The plates 38, 40, 42 are each provided with openings for the flow of fluid therethrough comprising a plurality in the order of one hundred to two hundred, small diameter symmetrically arranged holes 44. In each plate the openings or holes 44 define a total flow area in the range of 40 to 60 percent of the flow area of the pipe 10. The downstream edges of the holes 44 are preferably square so as to induce turbulence and mixing in the fluid. However, the upstream edge of the holes 44 may be rounded as illustrated in Fig. 6 or beveled as illustrated in Fig. 7 which serves to reduce the pressure drop across the plates. The plates 38, 40, 42 are preferably spaced about one pipe diameter apart.

As illustrated in Fig. 1, the flow straightening device 36 may be supported between flanges 47, 48 of two joining sections 50, 52 of the pipe 10. To this end, the plates 38, 40, 42 are supported in their parallel spaced relationship by a plurality of radially spaced supporting rods 54 which are illustrated more clearly in Fig. 2. The rods 54 are mounted in aligned slots 60 of the plates 38, 40, 42 and may be fixed to the same by any suitable means such as by welding.

The end plate 38 has a diameter somewhat larger than that of the plates 40, 42 to provide a flange 61 which seats on a flange 62 of a supporting ring 64. A shoulder 66 is formed on the inner surface of the supporting ring 64 to engage the periphery of the flange 61. With the plate 38 in this position it is then secured to the ring 64 as by welding as indicated in Fig. 2.

A pair of aligned shoulders formed on the oppositely disposed surfaces of the supporting ring 64 engage the walls of complemental recesses 72, 74 formed in the mating surfaces of the flanges 47, 48. When the flanges 47, 48 of the two pipe sections 50, 52 are tightened together such as by the bolts illustrated in Fig. 2, the supporting ring 64 will be clamped therebetween in axial alignment therewith by means of the shoulders 68, 70 and recesses 72, 74 to thus support the flow straightening device in the pipe 10.

In operation of the embodiment illustrated in Figs. 1 and 2, fluid flowing through the conduit 10 in the direction indicated by the arrow will enter the openings 44 in the first plate 38 and be broken up into a large number of small sections which tend to dissipate the motion of any swirls, whirls, spirals or lopsidedness in the fluid flow. Since the flow area of the plate 38 is approximately one half that of the pipe 10, there will be a substantial pressure drop across the plate 38 due to the rapid conversion of the initial pressure head into kinetic energy. Part of this pressure loss is regained as the kinetic energy is reconverted to pressure head.

It is desirable and necessary to have a substantial pressure drop to break-down the whirls, swirls, spirals and lopsidedness in the flowing fluid. However, to avoid unnecessary loss the inlet ends of the holes 44 may be rounded or beveled as shown in Figs. 6 and 7. Therefore, substantially all of the pressure drop is applied to the breakdown of the flow disturbances.

In the space between the plates 38, 40 the small flow sections intermingle into a turbulent flow of increased uniformity. This intermingling and turbulence is aided by the square downstream edges of the holes 44 which induces turbulent mixing of the small flow streams.

The second plate 40 functions the same as the plate 38 again dividing the flow into many small sections and creating a further breakdown of the flow disturbances. Downstream of the plate 40 the flow sections again intermingle into a more uniform turbulent flow. The third plate 42 serves to effect a still further breakdown of the flow disturbances. I have found that after the fluid has passed three plates a turbulent flow is obtained which equals or even exceeds the uniformity of undisturbed normally turbulent flow in a straight pipe of great length.

The space between successive plates of the flow straightener should be sufficient to permit the small flow sections to completely intermingle before flowing through the next plate. This intermingling action serves to further dissipate the swirls and to reduce the possibility of passing a localized swirl through two successive plates. I have found that good results are attained with a spacing of approximately one pipe diameter between adjacent plates.

The spacing between the last plate 42 and the primary element 12 should also be sufficient to permit the flow sections to completely intermingle so as to assure complete dissipation of any localized swirls that might possibly exist. As it has been found that such intermingling occurs in at least one pipe diameter this spacing may be of the same order of magnitude.

To illustrate the performance and the superior results achieved by my invention over prior art devices, I have conducted a series of hydraulic flow tests. In conducting these tests the system illustrated schematically in Fig. 8 was used.

To establish a standard to which results of the tests could be compared, a primary element comprising a 75% beta ratio concentric orifice was first calibrated in a 4-inch pipe having a straight length of 90 pipe diameters preceding it with 12 diameters following. The orifice was then installed at location 91 of Fig. 8. To produce disturbances, six 90 degree elbows not in the same plane indicated by the reference numerals 80, 82, 84, 86, 88, and 90 were arranged at right angles relative to each other and positioned upstream of the primary element 12. To further insure a high degree of non-uniform turbulence, the elbows were supplemented by disturber 92 positioned downstream thereof and formed from a plate with a number of segments turned at different angles. The various flow straightening devices tested were positioned downstream of the disturber at point 94 and a distance of 8 pipe diameters was provided between the downstream end of the straightener and the primary element at location 91.

For purposes of the test, the flow straightening device 36 was provided with three plates approximately 1/4" thick. Each of the plates were provided with approximately 180 holes of approximately 13/64" in diameter. A spacing of one pipe diameter was provided between adjacent plates.

Figure 9:
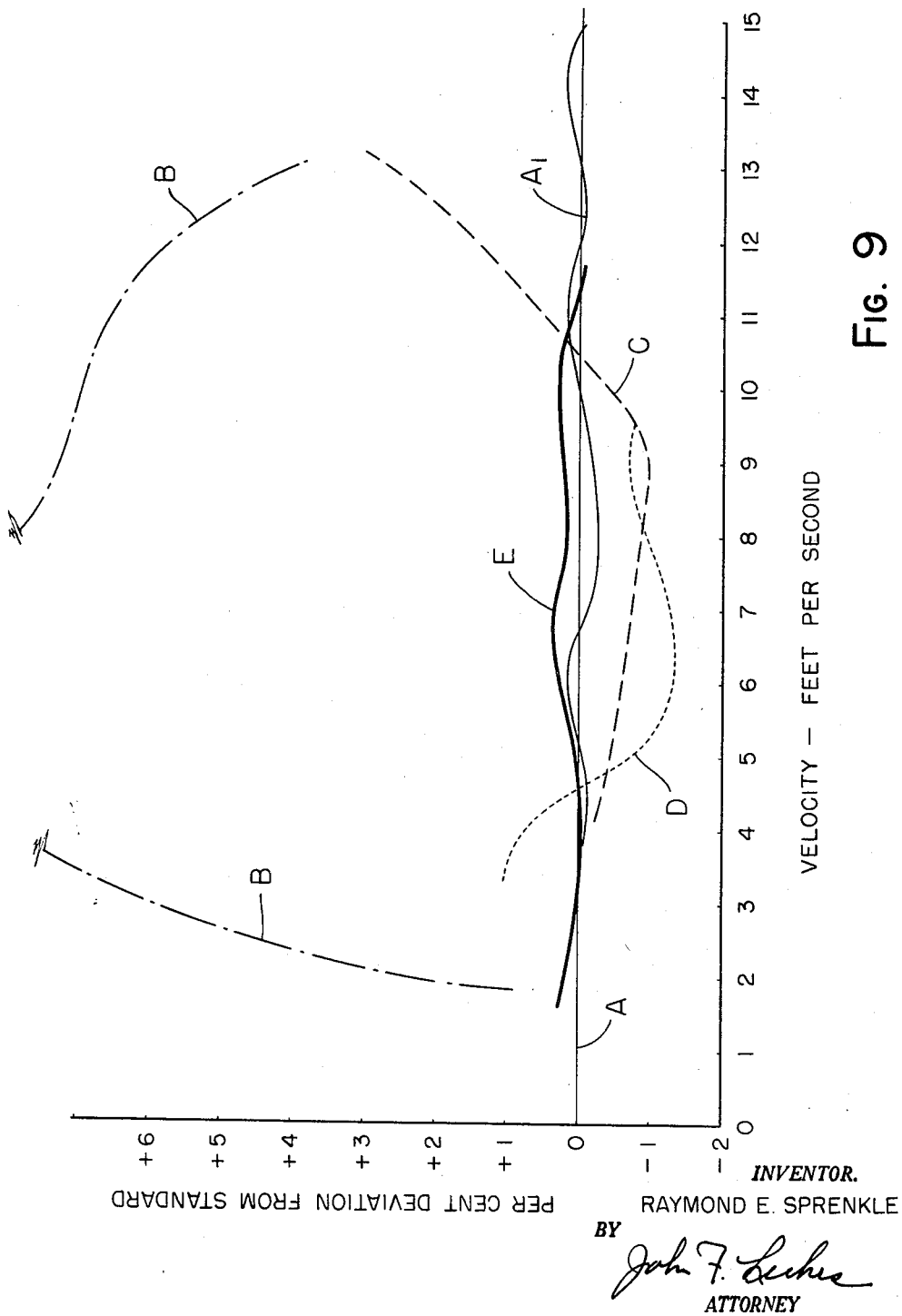

Referring now to Fig. 9, there is shown a graphical illustration of the deviation from standard of the coefficient of discharge of the 75% beta ratio concentric orifice with changes of velocity in the hydraulic test system. More particularly, the straight horizontal line indicated by the reference letter A at zero ordinate value represents the coefficient of discharge or calibration standard of the orifice in the aforementioned length of straight pipe. The curve A' is an average of the calibration readings from which line A is derived. The purpose of providing the straight line A is to establish an ordinate from which percent deviation could be plotted.

Figure 8:
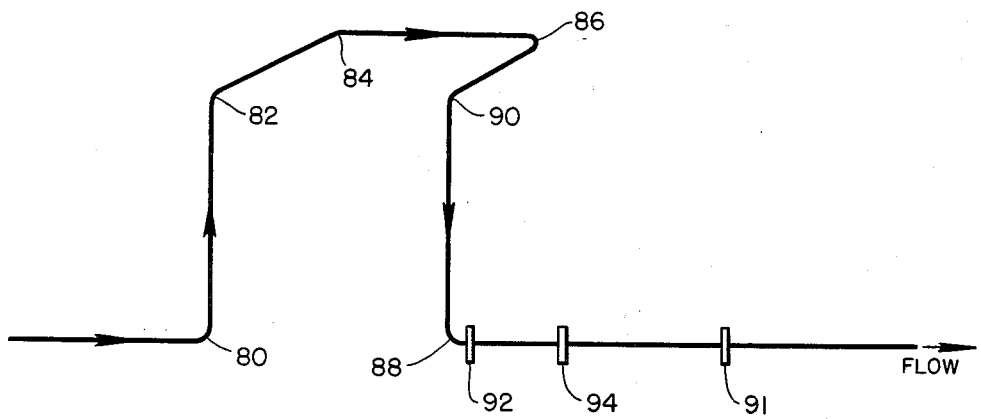
Fig. 8 is a schematic illustration of a testing apparatus used in determining the results which can be secured from my invention.

Curve B illustrates the percent deviation of the coefficient of discharge from the standard calibration line A for the apparatus illustrated in Fig. 8 when no flow straightening device was employed. It will be apparent from the extremely large deviations that the testing apparatus illustrated in Fig. 8 produced exceedingly large flow disturbances.

Curve C illustrates the percent deviation of the coefficient discharge from the standard calibration line A when a cross plate type of straightener was employed at point 94. This type of straightener as discussed previously comprises a plurality of parallel horizontal and vertical plates for sub-dividing the fluid flow into a number of sections. As illustrated by curve C this flow straightening device produces a deviation curve showing substantial improvement over curve B. However, there were still substantial deviations from the standard calibration curve A which increased with velocity.

Curve D illustrates percent deviation from standard of the coefficient of discharge when the multi-tube type of straightening device was employed. The deviation curve in this case is generally similar to that of the cross plate straightener, both devices producing substantial improvement over the highly disturbed conditions indicated by curve B, but still showing substantial deviation from the calibration standard.

Curve E illustrates percent deviation from standard of the coefficient of discharge when the straightening device 36 employing my invention was employed at point 94. This curve clearly shows that the flow straightening device 36 provides a substantial improvement over the prior devices. More particularly, the maximum deviation encountered was less than 1/2% even in the high velocity range.

It is to be noted in Fig. 9 that the deviation of the curve E from the calibration standard was no greater than the deviation of curve A' from which the standard calibration line A was obtained. Accordingly, it will be apparent that the flow straightening device 36 produces a uniformly turbulent flow corresponding to that existing in a straight pipe.

The test of the flow straightening device 36 was repeated with the distance between the primary element and downstream end of the straightener reduced to 4 pipe diameters. From this test a curve identical to curve E was obtained.

To further illustrate the results achieved with my invention, Pitot tube traverses were taken in both the vertical and horizontal planes at location 94 of Fig. 8 approximately one pipe diameter following the straightening device 36. The results of this traverse are illustrated in Fig. 10 wherein curve G is the velocity distribution curve obtained from a traverse in the horizontal direction and curve H is the velocity distribution curve obtained from a traverse in the vertical direction. As both of these curves are substantially symmetrical, it will be apparent that the flow at a point one pipe diameter downstream of the plate 42 is substantially uniformly turbulent.

It will be apparent that curves G and H of Fig. 10 are similar to curve K of Fig. 12 which is the characteristic flow profile of uniformly turbulent fluid flow in a straight pipe of great length. I believe that profiles G and H will become identical with profile K as the distance between the flow straightener and primary element is increased to approximately 4 diameters. As the great body of coefficient data now available to the art was obtained under flow conditions producing a velocity profile such as indicated at K it may be desirable to locate the primary element approximately 8 diameters downstream of my flow straightener in order to make use of such data. However, in view of the regular and substantially symmetrical flow profile obtained one diameter downstream of the flow straightener as illustrated by curves G and H it is evident that by the use of my invention the primary element may be located at distances approximately one pipe diameter from the straightener. As may be deducted from the relative flatness of curves G and H when compared to curve K the velocity profile at such distances has not yet been substantially affected by pipe wall friction hence, the differential pressure produced by a primary element at this distance is not affected by local disturbances caused by such things as variations in pipe roughness, etc. The flow meter is in other words rendered independent of its environment and as a matter of fact may be said to create its own environment.

Curves I and J of Fig. 11 illustrate a velocity distribution over the pipe diameter obtained from a Pitot tube traverse in both the horizontal and vertical planes respectively at a point immediately downstream of the flow disturber 92. These curves are indicative of the extremely high level of flow disturbance produced by the disturber 92 and the six 90 degree elbows.

In Fig. 13 curves L and M illustrate the velocity distribution in both vertical and horizontal planes existing one diameter downstream of the multi-tube straightening device hereinbefore described when installed at location 94 of Fig. 8. It is this unsymmetrical distribution which produced errors in flow measurement as illustrated by curve D of Fig. 9.

In Fig. 14 curves N and O illustrate velocity distributions one pipe diameter following the cross plate type of straightener when installed at location 94 of Fig. 8. These curves are not symmetrical about the axis of the pipe and have exceedingly pronounced cusps. With such a high velocity at the center, it will be apparent that a small change in the profile will effect substantial errors in flow measurement.

Another embodiment of my flow straightener 36 is illustrated in Figs. 4 and 5. The structure of this embodiment is generally similar to that illustrated in Figs.

1, 2 and 3 but differs in that it is formed by a plurality (in this case 3) discs 98, 100, 102 each comprising a circular section of wire mesh. The discs 98, 100, 102 define a flow area in the range of 40–60% of the flow area of the pipe 10 and are supported on rods 54 to fix the position of the same so that buckling of the screens 98, 100, 102 will not occur under the weight of the rods 54.

Figure 3:
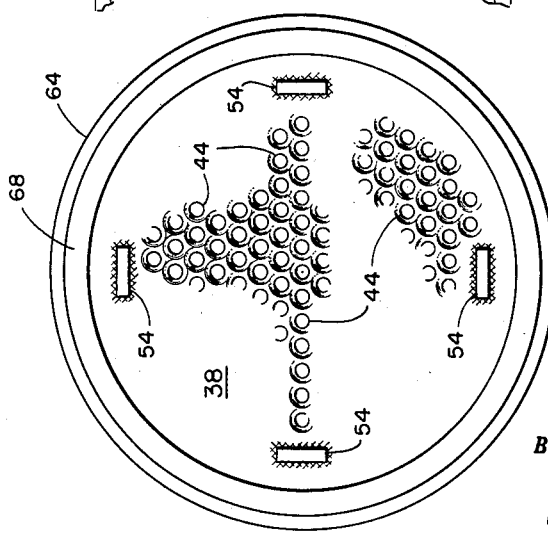
Fig. 3 is an end view taken along the line 3—3 of Fig. 2.

The flow straightening device illustrated in Figs. 4 and 5 is supported in the pipe 10 similar to the embodiment illustrated in Figs. 2 and 3, the ring 64 being clamped between the flanges of joining pipe sections in the manner illustrated in Fig. 2. The operation of the embodiment illustrated in Figs. 4 and 5 is also the same as that illustrated in Figs. 2 and 3.

While two embodiments of the invention have been herein shown and described, it will be apparent to those skilled in the art that many modifications may be made in the arrangement and construction of parts without departing from the scope of the invention as defined in the appended claims.

What I claim as new and desire to secure by Letters Patent of the United States, is:

1. A flow measuring apparatus comprising a length of straight pipe, a primary flow measuring element positioned within said pipe, three spaced parallel plates mounted in said pipe upstream of said measuring element, each of said plates having a plurality of openings therein defining a flow area in the range of 40–60% of the flow area of said pipe, the spacing between said plates being substantially equal to the diameter of said pipe and the spacing between said primary element and the plate immediately upstream thereof being at least equal to the diameter of said pipe.

2. A flow measuring apparatus as claimed in claim 1 wherein each of said plates have a plurality of drilled holes therethrough forming said openings.

3. A flow measuring apparatus as claimed in claim 1 wherein each of said plates comprises a section of wire mesh.

4. A flow measuring apparatus comprising a length of straight pipe, a primary flow measuring element positioned within said pipe, a flow straightening device positioned upstream of said measuring element and comprising an assembly of spaced parallel plates each having a plurality of openings defining a flow area in the range of 40–60% of the flow area of said pipe, the spacing between said plates being substantially equal to the diameter of said pipe, and the spacing between said primary element and the plate immediately upstream being at least equal to the diameter of said pipe.

5. A flow measuring apparatus comprising a length of pipe, a primary flow measuring element positioned within said pipe, and a flow straightening device positioned immediately upstream of said measuring element comprising a plurality of spaced axially aligned members, each of said members having a plurality of openings therethrough defining a flow area in the range of 40–60% of the flow area of said pipe, the spacing between said members being substantially equal to the diameter of said pipe, and the spacing between said primary element and the member immediately upstream being at least equal to the diameter of said pipe.

6. A flow measuring apparatus as claimed in claim 5 wherein the number of openings in each of said members is in the range of 100 to 200.

7. A flow straightening device for transforming a fluid flow in a conduit containing disturbances into a uniform turbulent flow comprising a flat plate positioned in the conduit and having a plurality of openings defining a flow area less than 60% of the area of the conduit, the openings in said plate being effective to divide the fluid flow into a plurality of sections which intermingle downstream of said plate to establish a turbulent flow of increased uniformity.

8. A flow straightening device as claimed in claim 7 wherein said plate comprises a circular section of wire mesh.

9. A flow straightening device as claimed in claim 7 wherein said plate is provided with a number of openings in the range of 100 to 200 and wherein the total area of the openings is in the range of 40 to 60 percent of the conduit area.

10. A flow straightening device as claimed in claim 7 wherein said openings comprise a plurality of drilled holes in said plate, each of said holes having a rounded upstream edge and a square downstream edge.

11. A flow straightening device as claimed in claim 7 wherein said openings comprise a plurality of drilled holes in said plate, each of said holes having a beveled upstream edge and a square downstream edge.

12. A flow straightening device for mounting within a pipe having a pipe coupling including a pair of flanges, comprising, a plurality of spaced parallel discs each having a plurality of openings therein defining a flow area less than 60% of the flow area of the pipe, and the spacing between said discs being at least equal to the diameter of said pipe, the diameter of each disc being slightly smaller than the inside diameter of the pipe, a plurality of spaced rods secured to said discs adjacent the periphery thereof for securing said discs in said parallel relationship to define an assembly adapted to be received in said pipe, and a flange fixed to the end of said assembly adapted to be clamped between said pair of flanges.

References Cited in the file of this patent

UNITED STATES PATENTS

| | | |
|---|---|---|
| 1,139,747 | Bayley | May 18, 1915 |
| 1,433,469 | Montgomery | Oct. 24, 1922 |
| 2,688,985 | Holdenried | Sept. 14, 1954 |